(12) United States Patent
Kim et al.

(10) Patent No.: US 8,478,200 B2
(45) Date of Patent: Jul. 2, 2013

(54) METHOD OF TRANSMITTING MEASUREMENT REPORT IN WIRELESS COMMUNICATION SYSTEM

(75) Inventors: Sunhee Kim, Anyang (KR); Sung-Hoon Jung, Anyang (KR); Seung June Yi, Anyang (KR); Sung Duck Chun, Anyang (KR); Sung Jun Park, Anyang (KR)

(73) Assignee: LG Electronics Inc., Seoul (KR)

( * ) Notice: Subject to any disclaimer, the term of this patent is extended or adjusted under 35 U.S.C. 154(b) by 170 days.

(21) Appl. No.: 12/822,041

(22) Filed: Jun. 23, 2010

(65) Prior Publication Data

US 2010/0330921 A1 Dec. 30, 2010

Related U.S. Application Data

(60) Provisional application No. 61/220,189, filed on Jun. 24, 2009, provisional application No. 61/220,590, filed on Jun. 26, 2009, provisional application No. 61/232,777, filed on Aug. 10, 2009.

(30) Foreign Application Priority Data

Jun. 18, 2010 (KR) .................. 10-2010-0058237

(51) Int. Cl.
*H04B 17/00* (2006.01)

(52) U.S. Cl.
USPC .................. 455/67.11; 709/224; 370/335

(58) Field of Classification Search
USPC .................. 455/67.11, 436, 452.2, 453, 450, 455/561, 418–420; 709/224; 370/252, 329, 370/335
See application file for complete search history.

(56) References Cited

U.S. PATENT DOCUMENTS

| 7,515,878 | B2 | 4/2009 | Zhang et al. | |
|---|---|---|---|---|
| 7,792,079 | B2* | 9/2010 | Choi et al. | 370/331 |
| 7,969,924 | B2* | 6/2011 | Young et al. | 370/311 |
| 2004/0219926 | A1 | 11/2004 | Kim et al. | |
| 2008/0167026 | A1* | 7/2008 | Eckert et al. | 455/418 |
| 2008/0310372 | A1 | 12/2008 | Li et al. | |
| 2009/0023449 | A1 | 1/2009 | Kim et al. | |
| 2010/0296467 | A1* | 11/2010 | Pelletier et al. | 370/329 |
| 2010/0325267 | A1* | 12/2010 | Mishra et al. | 709/224 |
| 2011/0122783 | A1* | 5/2011 | Lin et al. | 370/252 |

* cited by examiner

*Primary Examiner* — Ping Hsieh
*Assistant Examiner* — Chung-Tien Yang
(74) *Attorney, Agent, or Firm* — McKenna Long & Aldridge LLP

(57) ABSTRACT

Disclosed is a wireless communication system and terminal for providing a wireless communication service, and more particularly, a method of transmitting a measurement log from a terminal to a network when a RRC connected terminal has not found a RRC connectable network, although a wireless dedicated channel is not allocated between the terminal and the network, in an Evolved Universal Mobile Telecommunications System (E-UMTS) evolved from a UMTS, Long Term Evolution (LTE) System or LTE-Advanced (LTE-A) system.

6 Claims, 5 Drawing Sheets

METHOD OF TRANSMITTING MEASUREMENT REPORT IN WIRELESS COMMUNICATION SYSTEM

CROSS-REFERENCE

The present application claims priority benefit to the following applications, which contents are all incorporated by reference herein: U.S. Provisional Application Nos. 61/220,189 (filed Jun. 24, 2009), 61/220,590 (filed Jun. 26, 2009), 61/232,777 (filed Aug. 10, 2009), and Korean Patent Application No. 10-2010-0058237 (filed Jun. 18, 2010).

TECHNICAL FIELD

The present invention relates to a wireless communication system and terminal for providing a wireless communication service, and more particularly, a method of transmitting a measurement log from a terminal to a network when a RRC connected terminal has not found a RRC connectable network, although a wireless dedicated channel is not allocated between the terminal and the network, in an Evolved Universal Mobile Telecommunications System (E-UMTS) evolved from a UMTS, Long Term Evolution (LTE) System or LTE-Advanced (LTE-A) system.

BACKGROUND ART

FIG. 1 is a network architecture of a Universal Mobile Telecommunications System (UMTS). UMTS system is composed of a User Equipment (UE), a UMTS Terrestrial Radio Access Network (UTRAN) and a Core Network (CN). UTRAN includes at least one radio network sub-system (RNS), each of which includes one Radio Network Controller (RNC) and one or more base stations (Node Bs) managed by the RNC. One or more cells exist in one Node B.

FIG. 2 is an architecture of radio protocol layers used in UMTS. The radio protocol layers exist as a pair in a UE and UTRAN, and handle data transmission over radio interfaces. Explaining each of the radio protocol layers, first, a first layer as a physical (PHY) layer serves to send data over a radio interface using various radio transmission techniques. The PHY layer is connected to an upper layer, called a Medium Access Control (MAC) layer, via a transport channel. The MAC layer and the physical layer exchange data via the transport channel. Transport channels are categorized into dedicated transport channels and common transport channels depending on whether a channel is shared.

The second layer includes the MAC layer, a Radio Link Control (RLC) layer, a Packet Data Convergence Protocol (PDCP) layer and a Broadcast/Multicast Control (BMC) layer. First, the MAC layer maps various logical channels to various transport channels, and also perform a logical channel multiplexing for mapping several logical channels to one transport channel. The MAC layer is connected to an upper layer, called a RLC layer, via a logical channel. The logical channels are categorized into control channels for sending information of a control plane, and traffic channels for sending information of a user plane. The MAC layer is divided, according to a type of a transport channel to manage, into MAC-b sublayer, MAC-d sublayer, MAC-c/sh sublayer, MAC-hs/ehs sublayer and MAC-e/es or MAC-i/is sublayer. The MAC-b sublayer manages a Broadcast Channel (BCH) as a transport channel for managing broadcasting of system information, and the MAC-c/sh sublayer manages Forward Access Channel (FACH) as a common transport channel shared with other terminals, and MAC-d sublayer manages a Dedicated Channel (DCH) as a common transport channel for a specific terminal. In addition, for supporting a high-speed data transmission in downlink and uplink, the MAC-hs/ehs sublayer manages a High Speed Downlink Shared Channel (HS-DSCH) as a transport channel for high-speed downlink data transmission, and MAC-e/es or MAC-i/is sublayer manages an Enhanced Dedicated Channel (E-DCH) as a transport channel for high-speed uplink data transmission.

The RLC layer handles guarantee of QoS of each radio bear (RB) and data transmission. The RLC provides one or two independent RLC entities for each RB for the purpose of RB-specific QoS. The RLC layer manages segmentation and concatenation of data received from an upper layer to appropriately adjust a data size such that a lower layer can send data over an interface. Also, the RLC layer provides three operation modes, including a transparent mode (TM), an un-acknowledged mode (UM) and an acknowledged mode (AM), so as to guarantee various qualities of service (QoS) requirements of each radio bearer (RB).

A packet data convergence protocol (PDCP) layer located at the second layer is used to efficiently transmit IP packets, such as IPv4 or IPv6, on a radio interface with a relatively small bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interface. The PDCP layer is present on a packet-switched (PS) domain because the header compression is its basic function. For providing an effective header compression function for each packet service, one PDCP entity exists for each RB. Also, if the PDCP layer is present on a voice domain, the header compression function is not provided.

Among others, the BMC layer is present above the RLC layer in the second layer, and performs some functions, such as scheduling of a cell broadcast message and broadcasting to terminals located within a specific cell.

The RRC layer located at the uppermost portion of the third layer is only defined in the control plane. The RRC layer controls parameters of the first and second layers and also controls logical channels, transport channels and physical channels, in relation to configuration, re-configuration and release of Radio Bearers (RBs). Here, the RB denotes a logical path that the first and second layers provide for data transmission between the terminal and the UTRAN. In general, the establishment of the RB refers to stipulating the characteristics of protocol layer and channel required for providing a specific service, and setting the respective detailed parameters and operation methods.

DISCLOSURE

Technical Problem

In the related art, the terminal sent a measurement log thereof to a network for allowing the network to perform several operations, such as defining cell coverage, setting (establishing) mobility management, resetting (reestablishing) cell capacity and setting a common channel.

However, in the related art, the network could not correctly recognize when or in which radio environment the terminal had performed the measurement log. Especially, if a specific cell to which the terminal was connected was in a bad radio environment or the terminal performed an abnormal operation, the measurement log could not efficiently be sent to the network.

Technical Solution

Therefore, an object of the present invention is to provide a method for sending a measurement result or measurement log of a terminal to a network in a radio communication system more effectively than in the related art.

In particular, an object of the present invention is to provide a method for storing a measurement log of a terminal for effective Minimization Driving Test (MDT).

To achieve the objects of the present invention in accordance with one embodiment, there is provided a method of transmitting a measurement result in a wireless communication system, the method comprising: receiving, from a first network, a measurement configuration to be used at detecting an out-of-service area in a dormant state; moving into the dormant state, wherein the dormant state is a state that a dedicated radio resource is not allocated to a radio resource control (RRC) connected mode terminal; detecting the out-of-service area in the dormant state; storing the measurement result if the out-of-service area is detected; and transmitting, to a second network, the stored measurement result.

Also, to achieve the objects of the present invention in accordance with one embodiment, there is provided a method of transmitting a measurement result in a wireless communication system, the method including, from the UE perspective, receiving, from a first network, a measurement configuration to be used at detecting an out-of-service area in a dormant state, moving into the dormant state, wherein the dormant state is a state that a dedicated radio resource is not allocated to a radio resource control (RRC) connected mode terminal, detecting the out-of-service area in the dormant state, storing the measurement result if the out-of-service area is detected, and transmitting, to a second network, the stored measurement result.

Preferably, the measurement configuration may be received in a CELL_PCH state or CELL_FACH.

Preferably, the dormant state may be at least one of a CELL_PCH state, a CELL_FACH state and a URA_PCH state.

Preferably, the stored measurement result may be a measured value when the out-of-service area is detected.

Preferably, the stored measurement result may be a most recently measured value before the out-of-service area is detected.

Preferably, the first network may be the same as the second network.

Preferably, the out-of-service area may be detected if a terminal does not find a RRC connectable network for a certain time period in the dormant state.

Preferably, the measurement configuration may be a minimization driving test (MDT) configuration.

In accordance with another embodiment of the present invention, there is provided a method of transmitting a measurement log in a wireless communication system, the method including, from the UE perspective, finding a radio resource control (RRC) connectable network for a certain time period when a terminal is not allocated with a dedicated radio resource while the terminal is in a RRC connected mode, storing the measurement log if the terminal does not find the RRC connectable network for the certain time period, and transmitting the stored measurement log to a network.

Preferably, the radio resource control (RRC) connectable network may be a RRC connectable radio network control (RNC) or a RRC connectable cell.

Preferably, the RRC connected mode may be at least one of a CELL_PCH mode, a CELL_FACH mode and a URA_PCH mode.

Preferably, the stored measurement log may be a measured value when the terminal does not find the RRC connectable network for the certain time period.

Preferably, the stored measurement log may be a most recently measured value before the terminal does not find the RRC connectable network for the certain time period.

MODE FOR INVENTION

Figure 1:
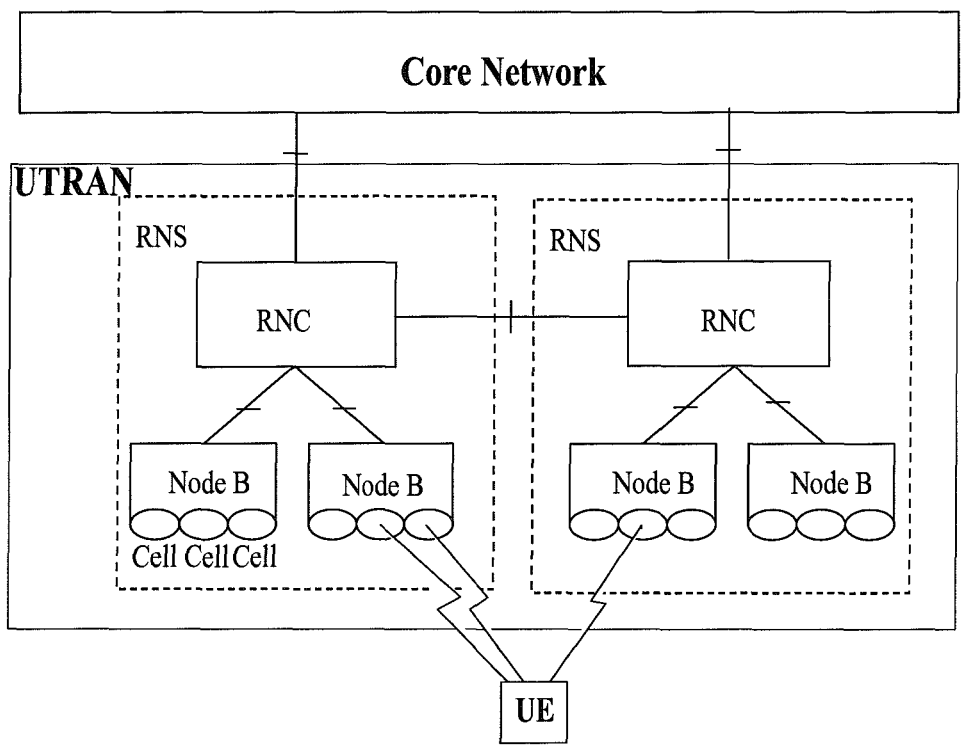
FIG. 1 is a network architecture of E-UTRAN as a mobile communication system to which the related art and the present invention are applied.
Figure 2:
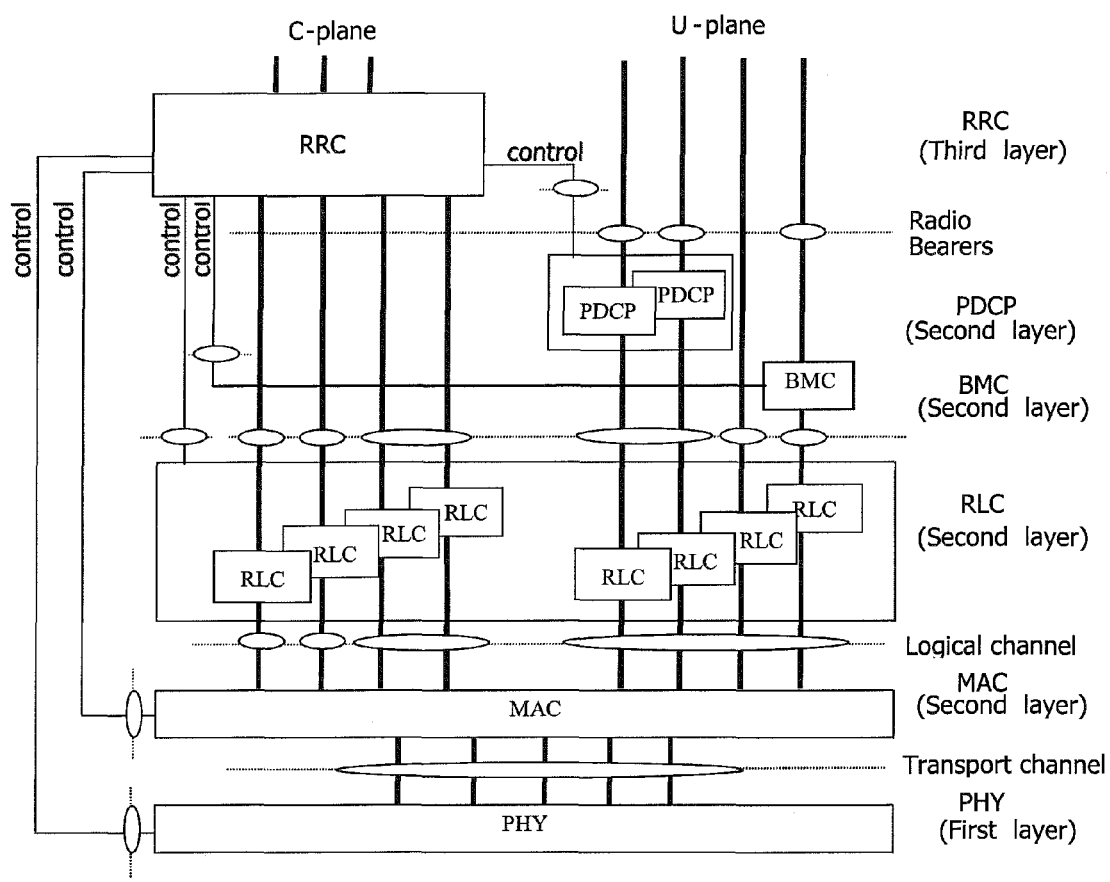
FIG. 2 is an exemplary view illustrating a radio protocol architecture to which the related art and the present invention are applied.

One aspect of this disclosure relates to the recognition by the present inventors about the problems of the related art as described above, and further explained hereafter. Based upon this recognition, the features of this disclosure have been developed.

The present invention is applied to 3GPP communication technologies, especially, to communication apparatuses and methods in UMTS system, UTE system or UTE-A system. However, the present invention may not be limited to this communication type, but applicable to any wired/wireless communication complying with the scope of the present invention.

The basic concept of the present invention is a method of transmitting a measurement result in a wireless communication system and a wireless mobile communication terminal capable of performing the method, the method including receiving, from a first network, a measurement configuration to be used at detecting an out-of-service area in a dormant state, moving into the dormant state, wherein the dormant state is a state that a dedicated radio resource is not allocated to a radio resource control (RRC) connected mode terminal, detecting the out-of-service area in the dormant state, storing the measurement result if the out-of-service area is detected, and transmitting, to a second network, the stored measurement result.

Also, the present invention proposes a method of transmitting a measurement log in a wireless communication system and a mobile communication terminal capable of performing the method, the method including finding a radio resource control (RRC) connectable network for a certain time period when a terminal is not allocated with a dedicated radio resource while the terminal is in a RRC connected mode, storing the measurement log if the terminal does not find the RRC connectable network for the certain time period, and transmitting the stored measurement log to a network.

Hereinafter, description will be given of the configurations and operations of the preferred embodiment according to the present invention with reference to the accompanying drawings.

First, a RRC state of a terminal and a RRC connection method will be described. The RRC state indicates whether a terminal RRC has a logical connection with a RRC of a network (e.g., UTRAN). The terminal which forms the RRC connection is said to be in the RRC connected mode (or state), and the terminal which does not form the RRC connection is said to be in the idle (dormant) mode (or state). A terminal in the connected mode forms the RRC connection, so the UTRAN can identify the existence of the corresponding terminal according to a cell unit, enabling an effective control of the terminal. On the other hand, the UTRAN cannot identify the existence of a terminal in the idle mode according to a cell unit.

In general, in the UMTS system, the terminal in the connected mode may further be divided into a CELL_DCH mode, a CELL_FACH mode, a CELL_PCH mode and a URA_PCH mode. In the CELL_DCH mode, the terminal and the UTRAN are allocated with an uplink dedicated physical channel and a downlink dedicated physical channel, respectively. Also, a terminal in the CELL_DCH mode may perform voice communication or data communication. Here, the network in the CELL_DCH mode manages a terminal based upon a current active set according to a cell unit.

The CELL_FACH mode denotes a mode in which dedicated physical channels are not allocated between the terminal and the UTRAN. However, the terminal in the CELL_FACH mode can consecutively monitor downlink common radio resources (e.g., HS-DSCH or FACH for MBMS reception). Also, the terminal in the CELL_FACH mode may immediately send data, which is generated to be sent, by using a predefined uplink common radio resource (e.g., RACH or E-DCH). Thus, the terminal in the CELL_FACH mode can immediately transmit or receive packet data small in size. The network recognizes the location of the terminal in the CELL_FACH mode according to a cell level which was notified via a CELL_UPDATE message previously sent by the terminal.

The terminal in the CELL_PCH mode disables data transmission but is managed according to a cell unit at the level of the network management. Here, the network may recognize the location of the terminal based upon a cell level notified via a CELL_UPDATE message which the terminal currently in the CELL_PCH mode sent in the previous CELL_FACH mode. Also, the CELL_PCH terminal monitors a paging channel for each DRX period. Upon need of an uplink transmission, the terminal in the CELL_PCH mode moves into the CELL_FACH mode.

A terminal in the URA_PCH mode has no data to send, but a network manages the connection of the terminal according to a registration area unit. Here, the network recognizes the location of the terminal according to the registration area unit notified via a URA_UPDATE message which the terminal currently in the URA_PCH mode sent when it was in the previous CELL_FACH mode. Similar to the terminal in the CELL_PCH mode, the terminal in the URA_PCH mode also monitors a paging channel for each DRX period. Upon generation of uplink data to be sent, the terminal changes into the CELL_FACH mode. Since a signaling load is less generated upon management according to a cell unit than upon management according to a registration area unit, if the same terminal in the CELL_PCH mode moves into the CELL_FACH mode more than a predetermined number of times for sending a CELL_UPDATE message and then sends the corresponding message, the corresponding terminal changes into the URA_PCH mode.

In general, the operation that the network changes the mode of the terminal from the CELL_DCH mode into the CELL_PCH mode or URA_PCH mode is for forming an RRC connection in order to allow a fast connection establishment with the terminal when data is to be generated later although the terminal does not have data to send to the network for a certain time period. If the network releases the RRC connection to change the terminal mode into the idle mode, when the terminal generates data to send, the network must establish the RRC connection again to thereafter perform the data transmission, which may cause a packet transmission delay upon frequent packet data transmissions. Accordingly, when the network changes the terminal mode from the CELL_DCH mode into the CELL_PCH mode, if the terminal does not find a suitable cell, the network has regarded as the terminal is in a bad radio (wireless) environment, but a radio quality of the terminal may actually be bad. That is, the terminal may perform an abnormal operation because the network does not know the exact radio quality of the terminal or due to a wrong setup (establishment) by the network.

Typically, when a user initially turns power of a terminal on, the terminal retrieves a suitable cell and thereafter stays in an IDLE mode in the corresponding cell. When a RRC connection is needed to be established, the terminal in the IDLE mode forms the RRC connection with the UTRAN RRC via a RRC connection procedure, and moves into a RRC_CONNECTED mode (e.g., CELL_DCH mode or CELL_FACH mode). There are many cases where the terminal in the IDLE mode required to establish the RRC connection, for example, when an uplink data transmission is needed due to a user's call attempt or the like, or sending a response message in response to reception of a paging message from UTRAN.

Services provided from the network to the terminal may be categorized into three types. The terminal may also differently recognize a cell type depending on which service can be provided. Hereinafter, various service types will first be described and then description of cell types will be followed.

A first service may be a limited service, which may provide an emergency call and ETWS in an acceptable cell. A second service may be a normal service. This service indicates a public service provided in a suitable cell. The last service is an operator service. This service indicates a service for a communication network operator. This service may be used only by the communication network operator, not by a normal user.

Cell types provided by a cell may be categorized as follows.

A first cell type is an acceptable cell, in which a terminal may receive the limited service. This cell is not barred in position of the corresponding terminal and may be a cell satisfying a cell selection criterion of the terminal. The second cell type is a suitable cell, in which a terminal can receive the normal service. This cell may satisfy the condition of the acceptable cell and simultaneously additional conditions. The additional conditions may include that the cell should belong to PLMN that the corresponding terminal is accessible and that the cell should be a cell in which a location area update procedure of the terminal is not forbidden. The third cell type is a barred cell, which is a cell for broadcasting information, called barred cell, via system information. The last cell type is a reserved cell, which is a cell for broadcasting information, called reserved cell, via system information.

Figure 3:
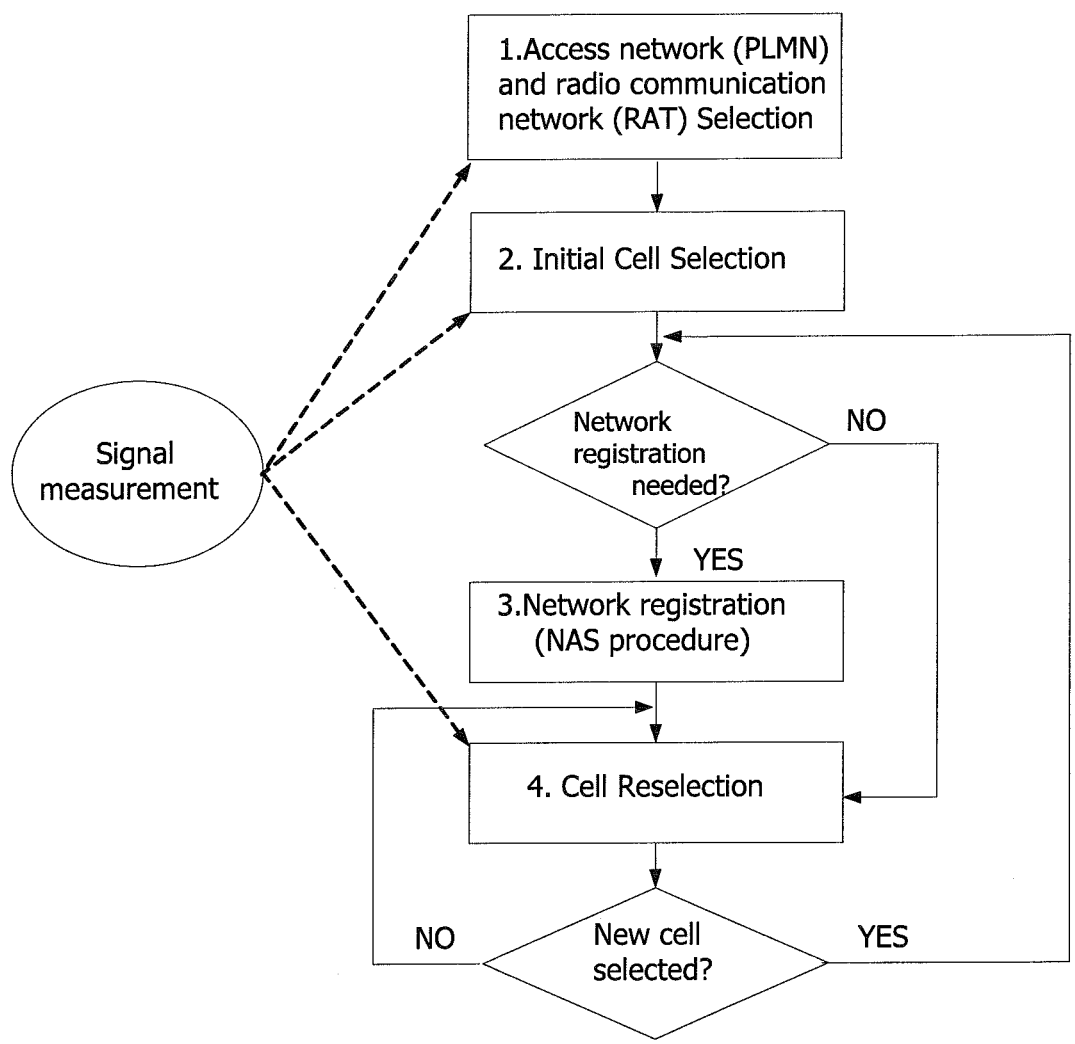
FIG. 3 is an exemplary view illustrating a procedure for an operation of a terminal to select a cell in a dormant mode.

FIG. 3 is an exemplary view illustrating a terminal operation of selecting a cell in an idle mode, which illustrates operations performed by an idle mode terminal after turn-on of the terminal.

First, the terminal selects a radio access technology (RAT, hereinafter) for communication with a network (Public Land Mobile Network, PLMN) through which the terminal wants to receive a service. Information related to PLMN and RAT may be selected by a terminal user, or stored in USIM for use.

Afterwards, the terminal selects a cell having the highest value for signal strength or quality, among cells whose signal strength or quality measured by a base station is higher than a particular value (Cell Selection). The cell selection procedure will be described later. After the cell selection, the terminal receives SI which is periodically sent by the base station. The particular value indicates a value defined in a system for ensuring quality for a physical signal during data transmission/reception. Thus, the value depends on an applied RAT.

The terminal then registers its own information (e.g., IMSI) for reception of a service (e.g., paging) from the network. The terminal does not have to register in a network that the terminal accesses every time of cell selection, but rather registers in the network when network related information (e.g., Location Area Identity, LAI) received from SI is different from network related information which the terminal already knows.

Afterwards, if a value of a signal strength or quality measured by the base station providing a service to the terminal is lower than a value measured by a base station of an adjacent cell, the terminal selects one of other cells which provides a signal characteristic better than that of the cell of the accessed base station. This process is referred to as a cell reselection to be distinguished from the initial cell selection of the above procedure. Here, in order to prevent a frequent cell reselection responsive to the changes in the signal characteristics, a time restraint condition may be present.

Hereinafter, the procedure in which the terminal selects a cell will be described in detail. Upon being turned on, the terminal must perform preliminary procedures for receiving a service by selecting a cell having an appropriate quality.

In general, an idle mode terminal must select a cell having an appropriate quality so as to be in ready to receive a service via the cell. For instance, a terminal which is just turned on should select a cell with an appropriate quality for registration in a network. If a terminal in a CELL_DCH mode moves into an IDLE mode, the terminal should select a cell to camp on. As such, a process in which the terminal selects a cell, which meets a particular condition, for camping on in a service idle state is referred to as Cell Selection. What is important is to select a cell as quick as possible because the cell selection is performed in a state where the terminal has not determined a cell to stay. Hence, for a cell which provides a radio signal quality better than a preset reference value, although the cell is not a cell which provides the terminal with the best radio signal quality, the cell may be selected during the cell selection of the terminal.

Hereinafter, a method by which a terminal selects a cell and a procedure thereof will be described. Upon being turned on, the terminal retrieves usable PLMNs and selects a PLMN appropriate to receive a service therethrough. The terminal then selects a cell having signal quality and characteristic as good as being capable of receiving an appropriate service, among cells provided in the selected PLMN. The cell selection process may be divided into two types.

First, there is an initial cell selection. During this process, the terminal has no prior information relating to a radio channel, so the terminal retrieves every radio channels for finding an appropriate cell. The terminal finds the strongest cell from each channel. If a suitable cell which meets a cell selection criterion is found, the terminal selects the corresponding cell.

Also, there is a cell selection utilizing stored information. In this process, a cell selection is performed by utilizing information stored in the terminal in relation to a radio channel or information broadcast in a cell, thereby allowing a quick cell selection as compared to the initial cell selection process. If a cell satisfying a cell selection criterion is found, the terminal selects the corresponding cell. If any suitable cell satisfying the cell selection criterion is not found through this process, the terminal performs the initial cell selection process.

The cell selection criterion used by the terminal during the cell selection is described as follows:

Cell Selection Criterion: Srxlev>0, where: Srxlev=Qrxlevmeas−(Qrxlevmin+Qrxlevminoffset)−Pcompensation  Equation 1)

The cell selection criterion may use the following factors.
Qrxlevmeas a reception level of a measured cell (RSRP)
Qrxlevmin a minimum reception level required in a cell (dBm)
Qrxlevminoffset an offset for Qrxlevmin
Pcompensation max (PEMAX−PUMAX, 0) (dB)
PEMAX a maximum transmission power allowing transmission of the terminal in a corresponding cell (dBm)
PUMAX a maximum transmission power of a terminal radio frequency (RF) depending on a terminal performance (dBm)

As defined in Equation 1, it can be noticed that the terminal selects a cell whose measured signal strength and quality is higher than a certain value defined in a cell providing a service. Parameters used in Equation 1 are broadcast via system information. The terminal then receives the parameter values to use for the cell selection criterion.

Upon selection of a cell meeting the cell selection criterion, then the terminal receives information required for its IDLE mode operations in the corresponding cell via the system information of the corresponding cell. After reception of all the information required for the IDLE mode operations, the network may wait in an idle mode for requesting a service (originating call) or receiving a service (e.g., terminating call) from the network.

After the terminal selects a certain cell via the cell selection process, the signal strength or quality between the terminal and the base station may change due to variations of the terminal mobility or radio environments. Consequently, if the quality of the selected cell is degraded, the terminal can select another cell providing better quality. For the reselection of the cell, a cell providing a signal quality better than a currently selected cell is generally selected. This process is referred to as a cell reselection. The cell reselection process basically aims to selection of a cell providing the best signal quality to the terminal in view of quality of a radio signal. In addition to the quality of the radio signal, the network may determine priorities for each frequency so as to notify the same to the terminal. Upon reception of the priorities, the terminal may primarily consider the priorities rather than the radio signal quality criterion during the cell reselection.

However, basically, once the existing serving cell meets a radio quality higher than a preset level, the terminal may not change the serving cell. Hence, if a radio quality of the serving sell of the terminal becomes lower than a preset threshold value, the terminal starts measurement for a neighboring cell received via system information. The measurement of the neighboring cell is executed to have different threshold values depending on whether the cell is a cell having the same central frequency as or a different central frequency from that of the serving cell, or whether the cell has a different RAT type from the serving cell.

For the cell reselection, the terminal measures qualities of the serving cell and the neighboring cell (and other attributes, for example, information included in broadcast information). The cell reselection is performed based upon a cell reselection criterion. The cell reselection criterion has the following characteristics in relation to the measurement of the serving cell and the neighboring cell.

An intra-frequency cell reselection is basically based upon ranking. Here, the ranking is an operation of defining index values for cell reselection estimation and orders in the order of sizes of the index values of cells using the defined index values. The cell index value is a value applying a frequency offset or cell offset, if necessary, based upon a value measured for a corresponding cell by the terminal.

An inter-frequency cell reselection is based upon a frequency priority provided by a network. The terminal attempts to camp on a frequency having the highest frequency priority. The network may provide frequency priorities to be commonly applied by terminals within a cell via a broadcast signaling, or provide frequency-specific priorities for each terminal via a terminal dedicated signaling.

For the inter-frequency cell reselection, the network may provide a parameter (for example, frequency-specific offset) for each frequency so as for the terminal to use it for the cell reselection.

For the intra-frequency or inter-frequency cell reselection, the network may provide the terminal with a neighboring cell list (NCL) used by the terminal for the cell reselection. The NCL may include parameters for each cell (for example, cell-specific offset) used for the cell reselection.

For the intra-frequency or inter-frequency cell reselection, the network may provide the terminal with a cell reselection black list for cell reselection. A terminal may not perform the cell reselection for cells included in the black list.

Hereinafter, the ranking performed during a cell reselection evaluation will be described. Index values used for ranking cells are defined as expressed by Equation 2. The subscript $s$ denotes a serving cell and $n$ denotes a neighboring cell.

$$R_s = Q_{meas,s} + Q_{Hyst}$$

$$R_n = Q_{meas,n} - Q\text{offset} \quad \text{Equation 2)}$$

Terms used in Equation 2 will be described as follows.

| | |
|---|---|
| Qmeas | A quality value measured by the terminal for a corresponding cell |
| Qoffset | Intra-frequency: when a terminal receives Qoffsets, n value between a serving cell and a neighboring cell with respect to a specific neighboring cell, Qoffset = Qoffsets, n. When the terminal does not receive Qoffsets, n value with respect to the corresponding cell, Qoffset = 0.<br>Inter-frequency: when the terminal receives Qoffsets, n value with respect to the corresponding cell, Qoffset = Qoffsets, n + Qfrequency. When the terminal does not receive Qoffsets, n value with respect to the corresponding cell, Qoffset = Qfrequency. |
| Qhyst | If a cell reselection index value Rs of a serving cell and a cell reselection index value Rn of a neighboring cell vary in a similar state to each other, ranking is frequently changed due to the variation, whereby the terminal may alternately reselect the two cells. This is a parameter for preventing the terminal from alternately reselecting the two cells by creating a type of historical phenomenon for the cell reselection. |

The terminal measures Rs of the serving cell and Rn of each neighboring cell according to Equation 2, and regards a cell having the highest Rn value as the best ranked cell so as to reselect this cell, which is usually called as R-criterion. According to the definition of R, it can be confirmed that the quality of a cell works the most significant criterion in the cell reselection based upon the R-criterion. Upon comparison of R value, only when the comparison state is maintained for a time set to treselection, the cell reselection is generated. If the reselected cell is not a suitable cell, the terminal excludes the corresponding frequency or the corresponding cell from targets to be reselected.

A terminal in the CELL_DCH mode recognizes a problem of a radio link by using synchronization information (for example, in sync info, out of sync info, etc.) received from a physical layer, namely, upon reception of N number of out of sync info within a preset time. On the other hand, a terminal in the CELL_FACH, CELL_PCH or URA_PCH mode performs the cell reselection process. If the terminal does not find any cell capable of performing a normal service within a preset time period during the cell reselection process, the terminal recognizes it as existence of a problem in a radio link. This is considered as detection of an out-of-service area.

Upon recognition of the radio link problem, the terminal in the CELL_DCH mode checks whether a wireless environment has been improved within a preset time by use of synchronization information (e.g., in sync info and out of sync info). Upon sequentially receiving N number of in-sync-info within the preset time, the terminal determines the improvement of the wireless environment and if not, determines a failure of the radio link. If any cell capable of performing a normal service is not found within a preset time after recognizing the problem of the radio link, namely, after detection of the out-of-service area, the terminal in the CELL_FACH, CELL_PCH or URA_PCH mode determines it as failure of the radio link so that the terminal releases every radio resources connected and transits into an idle mode. If a cell capable of performing the normal service is found within the preset time, the terminal in the aforesaid mode determines it as detection of an in-service area, and considers as the terminal being under Re-entering Service.

In general, the out-of-service area and the in-service area are applied only to terminals which are not allocated with a dedicated radio channel in CELL_FACH, CELL_PCH or URA_PCH mode. The out-of-service area is a cell area in which a terminal in a connected state without an allocated dedicated radio channel determines the existence of the problem in the radio link.

Hereinafter, the out-of-service area will be described in more detail.

As stated above, the cell reselection process is performed such that a terminal selects a cell with better quality so as to camp on the selected cell. If a terminal is in "camped normally" state or a "camped on any cell" state, the terminal monitors neighboring cells notified by a measurement control within system information of a serving cell and detects the corresponding cell so as to synchronize with the cell. The terminal then measures qualities of downlink radio links, such as CPICH Ec/Io or CPICH RSCP level of the serving cell, and evaluates the cell selection criterion of the serving cell at least per every DRX period. The cell selection criterion has been described before. That is, if the cell selection criterion value of the serving cell does not meet the cell selection condition for a preset time, namely, for a continuous DRX period which was set to Nserv, the terminal starts measurement of values of all the received neighboring cells irrespective of the current measurement condition. If any new suitable cell is not found even by the measurement of all the cells, the terminal performs the initial cell selection process for a selected PLMN. For instance, if a terminal in the CELL_PCH or URA_PCH mode has not selected a new cell even after 12 seconds elapsed, the terminal is regarded as being present in the out-of-service area. After PLMN selection, the terminal changes into the IDLE state to find a suitable cell in another frequency or RAT, and then camps on the corresponding cell. If the terminal has not found an acceptable cell after the PLMN selection, the terminal keeps waiting until finding the acceptable cell.

In other words, terminals in the CELL_FACH, CELL_PCH and URA_PCH modes perform the cell reselection process. However, the terminals may not move into a cell with better quality even through the normal cell reselection process and the radio quality of a serving cell of the terminal may be worse than a cell selection criterion value for the initial cell selection process. In this case, a certain terminal may perform the initial cell selection process. Here, if the terminal has not found a suitable cell through the initial cell selection process for a preset time period, it may be understood as a problem has occurred at a downlink radio link and even the attempt to solve the problem has been failed. Hence, if the terminal in the CELL_FACH, CELL_PCH or URA_PCH mode does not find a suitable cell within the preset time, the corresponding terminal is considered as being present in the out-of-service area. Also, if the terminal transits from the CELL_DCH mode into CELL_PCH or URA_PCH mode, if the terminal does not immediately find a suitable cell, it is considered as the terminal being in the out-of-service Area.

When the terminal in the CELL_FACH, CELL_PCH or URA_PCH mode detects the out-of-service Area, the terminal then performs the cell selection process mentioned above, and starts a specific timer (for example, T307 timer). If the terminal finds a suitable cell and moves into an in-service area while the specific timer works, the terminal stops the specific timer working. This moment is a moment that the terminal is present in a re-entering-service area. Afterwards, the terminal sends an UPDATE message including the re-entering-service area cause to a network. If the terminal does not detect the in-service area until the specific time expires, the terminal changes into the idle mode.

Hereinafter, Minimization Driving Test (MDT) will be described. A principal purpose of MDT is to change a test, which was executed using an actual vehicle by the existing operators, into an efficient scheme, in order to ensure coverage optimization. That is, one scheme is to detect a coverage hole. Coverage depends on a construction of a new base station or building or a user's usage environment. Thus, an operator must periodically execute a driving test, which causes consumption of a lot of costs and resources. MDT has a concept of using users' terminals instead of actual coverage measurement by the operators. This new function may affect a RRC structure.

Hereinafter, when a terminal stores a measurement log thereof will be described. In general, a terminal measures its log at a specific time point in order to reduce a driving test as much as possible. The terminal measures a network environment when predefined trigger conditions described as follows are generated. Table 1 exemplarily shows trigger conditions as to when a terminal log measurement is performed.

TABLE 1

Measurement Trigger Conditions

| Measurement Trigger Condition | Description |
|---|---|
| Periodic Timer Based | A terminal measures a network environment for every specific time period notified by the network |
| Serving Cell becomes worse than threshold | When a reception level of a downlink radio channel of a serving cell connected to the current terminal is worse than a specific value notified by the network, the terminal measures a log at that time point. |
| RRC connection re-establishment/Cell Update after Radio Link Failure | After a RLF generation, if the terminal performs CELL Update process or RRC Connection Re-establishment process, the terminal measures a log at the time point when the process is generated. |
| Random Access Failure | The terminal measures a log at the time point of RACH access process failure. |

As shown in Table 1, the measurement trigger conditions for the terminal to store a log are divided into a period-based method and an event trigger-based method. The event trigger-based method is applied when a quality of a downlink radio link measured by a terminal is lower than a specific reference value, upon transmitting a RRC message due to a radio link failure, or upon an uplink radio link access failure.

In general, the methods for storing a measurement log of a terminal includes a period-based method and an event trigger-base method. The simplest method is to inform a preset time period for storing a log from a network to a terminal such that the terminal can measure its log for every preset time period so as to inform the measurement log to the network. However, if the network sets an extremely short time period, the terminal may measure an unnecessary log too many times, and if the network sets an extremely long time period, a radio environment may become very bad before the log measurement after the time period. In this case, such information may not be terminal log information at an actually usable time point.

On the contrary to the period-based method, the event trigger-based method is configured such that a terminal measures its log when a preset condition is met. Compared with the period-based method, the event trigger-based method measures the log only when the log measurement of the terminal is actually needed, so the efficient log measurement may be allowed without an unnecessary measurement of the terminal log. The event trigger-based methods may include a method of measuring a terminal log by checking a radio quality of a downlink radio link of the terminal, and a method for measuring a terminal log by checking a radio quality of an uplink radio link of the terminal. If the terminal is present in the CELL_PCH or URA_PCH mode, the terminal has no data to send in uplink, so the terminal must measure the terminal log after checking the radio quality of the downlink radio link. The measurement of a terminal log after checking the radio quality of the downlink radio link may be performed in two cases, namely, at a time point of transmitting RRC reestablishment after radio link failure (RLF), and when the downlink radio link quality of a serving cell is lower than a specific threshold value.

As mentioned above, one of the event trigger conditions for storing a measurement log by the terminal is to measure the terminal log upon RRC reestablishment due to a radio link failure (RLF). Here, the terminal recognizes the RLF through the following processes. That is, if the terminal receives a specific number of out-of-sync or more from a physical layer for a preset time period so as to be informed that a radio quality of a downlink radio link is not in a good condition, the terminal determines that the downlink radio link has a problem. Afterwards, if the problem of the radio link is solved within a preset time, namely, if the terminal consecutively receives a specific number of in-sync or more from the physical layer within a preset time period so as to be informed that the radio quality of the downlink radio link becomes good, the terminal determines that the problem of the radio link has been solved. If the terminal does not receive the specific number of In-sync within the preset time, the terminal determines that the radio link was failed, namely, RLF has occurred. Accordingly, the terminal releases all the pre-allocated radio resources and changes into the IDLE mode, thereby retrieving an appropriate cell again.

Afterwards, the terminal performs RRC reestablishment process or Cell update process. That is, upon reestablishment due to the RLF, if the radio link problem is solved within a preset time although the radio environment is still bad at a specific time point, since the radio link failure does not occur at the corresponding time point, the terminal does not perform the log measurement.

On the contrary, as another event trigger condition, when the downlink radio link quality of the serving cell becomes lower than a preset threshold value, the terminal continuously performs the log measurement even when an instantaneous downlink radio link quality of the serving cell is bad. On the other hand, if the threshold value is extremely low, the terminal cannot measure the log even if the downlink radio link quality is not good. Hence, the most efficient method for sending necessary information from the terminal to the network without unnecessary log measurement may be that the terminal performs the log measurement at the time point of Reestablishment after RLF occurrence.

As described above, if the RLF occurs in a terminal in a connected state, it is considered as the failure of the radio link connected between the terminal and the network results from the existence of a coverage hole within a cell in which the RLF occurred. Also, the coverage hole detection is the most significant purpose of the aforesaid MDT, so radio environment information relating to the cell, in which the RLF occurred, received from the terminal, is very important to the network. However, as mentioned above, unlikely in LTE system, a terminal in the connected state, namely, in the CELL_FACH, CELL_PCH or URA_PCH mode, cannot recognize the RLF in UMTS system. However, in the UMTS system, the network can request the status transition from the IDLE mode into the CELL_FACH, CELL_PCH or URA_PCH mode from the corresponding terminal, under the reason, for example, of necessity of faster data transmission and reception. Accordingly, a connection should be established between the terminal in the connected state and the network for normal data transmission and reception. Hence, if the terminal in the CELL_FACH, CELL_PCH or URA_PCH mode cannot perform the normal data transmission and reception with the network, it can also be regarded as the coverage hole being present in the corresponding cell. Also, as many smart phones come into wide use, terminals in the CELL_FACH mode, in which a less amount of data is transmitted and received, or terminals in the CELL_PCH or URA_PCH mode, which exist for fast connection establishment responsive to a frequent data transmission, are getting increased. Consequently, when the terminals in the corresponding states do not perform the normal data transmission and reception, informing network environment information relating to the corresponding cell to the network becomes far more important for MDT.

As aforesaid, the terminal may detect an out-of-service area if the terminal has not found a suitable cell after a status transition from CELL_DCH into CELL_PCH or URA_PCH mode, or if the radio link quality of the serving cell is suddenly getting worse and the terminal has not continuously found a suitable cell for a preset time period while the terminal in the CELL_FACH, CELL_PCH or URA_PCH mode performs the cell reselection process. However, upon the detection of the out-of-service Area, for example, if the terminal finds a suitable cell again, the terminal sends a CELL UPDATE message including the re-entering service cause to the network. Afterwards, upon reception of the message, the network can be notified that the terminal has found a cell again after detection of the out-of-service area. That is, the network can know the existence of the terminal in the out-of-service area, without being notified as to when and in which cell the terminal was present. The network, nevertheless, may recognize, using measurement information for MDT, sent by the terminal, that the coverage hole is present in the corresponding cell and then try to perform reestablishment of a cell radius or establishment of other parameters. Here, what the network actually needs to know is when, how and where the terminal is present in the cell, which is predicted as having the coverage hole, and how the radio environment was in that moment. Hence, the network should know when the terminal detected the out-of-service area under what radio environment and in which radio environment the terminal was present when detecting the out-of-service area, or how the radio environments were for the serving cell and the neighboring cell, measured just before detection of the out-of-service area. Also, as mentioned above, measuring the network environment when the terminal in CELL_FACH, CELL_PCH or URA_PCH mode performs an abnormal operation, such as when the terminal cannot select a suitable cell due to a non-accessible PLMN. That is, since the terminal is in the connected mode, the network already knows a usable PLMN when the terminal in the idle mode selects the PLMN.

The present invention proposes a method in which in a state where a terminal is not allocated with a dedicated radio resource from a network although a RRC connection is present between the terminal and the network, if the terminal has not found a RRC connectable network for a preset time period, the terminal stores a radio environment measurement value at the time point and thereafter provides the stored measurement value to the network or to another network.

The reason of storing a measurement log of a terminal is because the network can establish a coverage of a cell, establish a mobility management, reestablish a cell capacity and establish a common channel based upon the measurement log of the terminal. The measurement log information of the terminal used for establishment performed by the network may further be advantageous when a radio environment of a specific cell connected to the network is not good or a terminal performs an abnormal operation, because the network may reestablish a cell coverage or reestablish appropriate channel establishment information of the corresponding cell, with respect to a cell whose radio environment is not good or in which the terminal does not perform a normal operation.

In the present invention, if a RRC state of a terminal is CELL_FACH, it is determined that a RRC connection is present between the terminal and a network but the terminal is not allocated with a dedicated radio resource from the network.

In the present invention, if an RRC state of a terminal is CELL_PCH or URA_PCH, it is determined that a RRC connection is present between the terminal and a network but the terminal is not allocated with a dedicated radio resource from the network.

In the present invention, if a terminal detects an out-of-service area, it is determined that the terminal has not found a RRC connectable network for a preset time period.

In the present invention, if the terminal is not provided with a normal service from the network within a preset time period, it is determined that the terminal has not found a RRC connectable network for a preset time period.

In the present invention, if the terminal has not found a suitable cell within a preset time period, it is determined that the terminal has not found a RRC connectable network for a preset time period.

In the present invention, a radio environment measurement value stored in a terminal may be a radio environment measurement value at a time point when determination is made that the terminal has not found a RRC connectable network for a preset time period.

In the present invention, a radio environment measurement value stored in a terminal may be the most lately measured usable radio environment measurement value at the time point when the determination is made that the terminal has not found a RRC connectable network for a preset time period.

The terminal repeatedly measures a network environment and stores the same whenever it is determined that the terminal has not found a RRC connectable network for a preset time period.

In the present invention, after the terminal has not found a RRC connectable network within the preset time period, if the terminal finds a network having a RRC connection with the terminal within a preset time period, the terminal stores a radio environment measurement value at that time point.

In the present invention, after the terminal has not found a RRC connectable network within the preset time period, since the terminal has not found yet the RRC connectable network within another preset time period, if the terminal has changed into an IDLE mode having no RRC connection with a network and thereafter finds a previous connected network or another network for establishing the RRC connection therewith, the terminal stores the radio environment measurement value at that time point.

The radio environments measured and stored by the terminal may be as follows. First, the terminal may measure a serving cell and store the measurement value. Also, the terminal may measure a cell included in a neighboring cell list sent by the serving cell and store the measurement value. The terminal may also measure location information and time information relating to each cell to be measured and stores the same. The terminal may also measure Primary Scrambling Code (PSC) or global cell ID of each cell to be measured and store the same.

Table 2 exemplarily shows in detail which radio environment the terminal may measure.

TABLE 2

Details of Terminal Measurement

| What does the terminal measure? | Illustrative description |
|---|---|
| CPICH_RSCP | Signal code power received by terminal |
| CPICH Ec/No | Energy received by terminal for each chip proportional to power density |
| UE Transmission Power | Transmission power of terminal |
| Downlink BLER | Reception block error rate of terminal |

The present invention proposes a method in which when the terminal can send uplink data, the terminal provides measurement values thereof as well as the uplink data to the network or another network.

Figure 4:
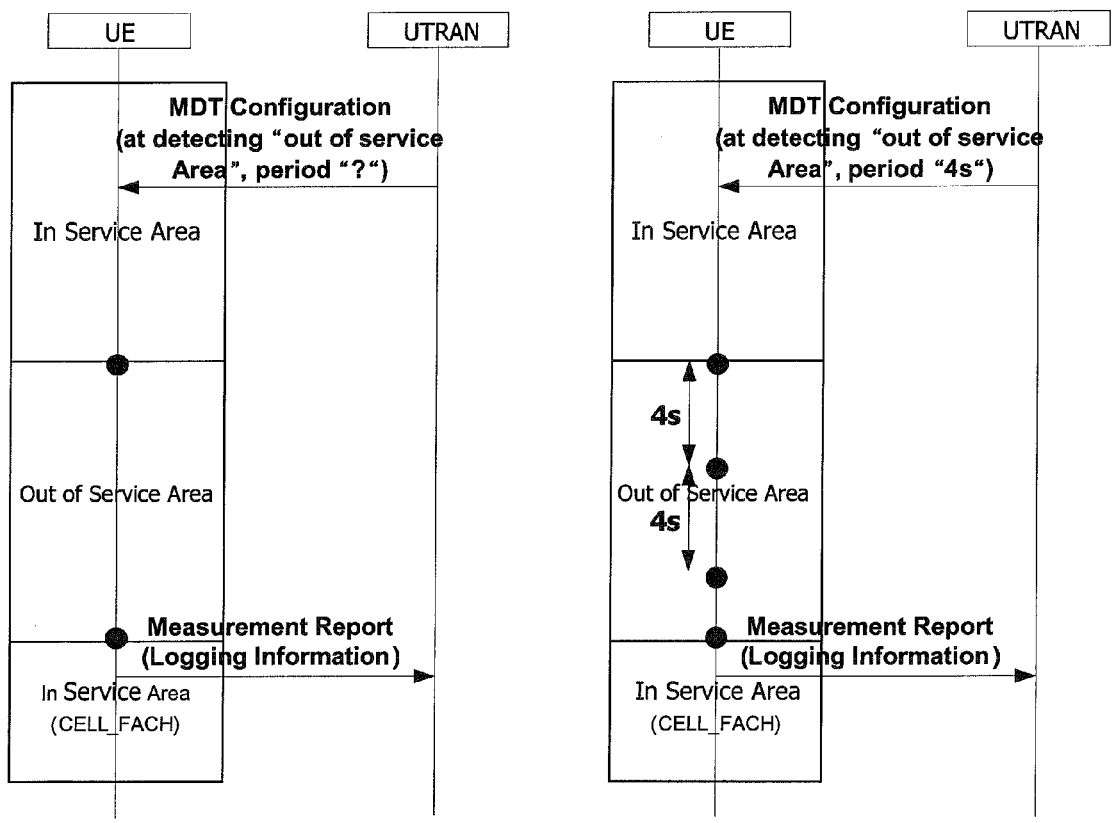
FIG. 4 is a first exemplary view illustrating a method for transmitting a measurement report to a network in accordance with the present invention.

FIG. 4 is a first exemplary view illustrating a method of transmitting a measurement report from a terminal to a network in accordance with the present invention.

First, a network may inform the terminal, via establishment information for MDT (i.e., MDT configuration), when the terminal should store a measurement value of a radio environment for MDT. Here, when the terminal detects an out-of-service area, the network may inform the terminal to store the measurement value of the radio environment, and also inform the terminal of period related information relating to when the terminal should re-store the measurement value of the radio environment after the terminal detects the out-of-service area. Here, the period related information may be a certain value or an infinite value. Afterwards, when the terminal detects the out-of-service area, the terminal may store the measurement value of the radio environment thereof. The radio environment measurement value may be a measurement value at the detecting of the out-of-service area or a previous measurement value which can be used at the detecting of the out-of-service area. After detection of the out-of-service area, if the terminal finds a suitable cell to be present in an in-service area before the terminal moves into the idle mode, the terminal may store the radio environment measurement value at that time point. The stored radio environment measurement value may be sent to the network together with a Measurement Report message when a terminal in CELL_FACH mode is present in the in-service area or moves into CELL_DCH mode by receiving new establishment information from the network. Here, the measurement value may be sent together with another RRC message or NAS message upon transmission of the corresponding message. When the terminal receives a response indicating a successful reception of the RRC message or NAS message from the network, for example, upon receiving RLC ACK responsive to the Measurement Report message, the terminal may delete the stored measurement value. In FIG. 4, when the terminal moves from the out-of-service area back into the in-service area, the terminal may not measure and report the network environment.

Figure 5:
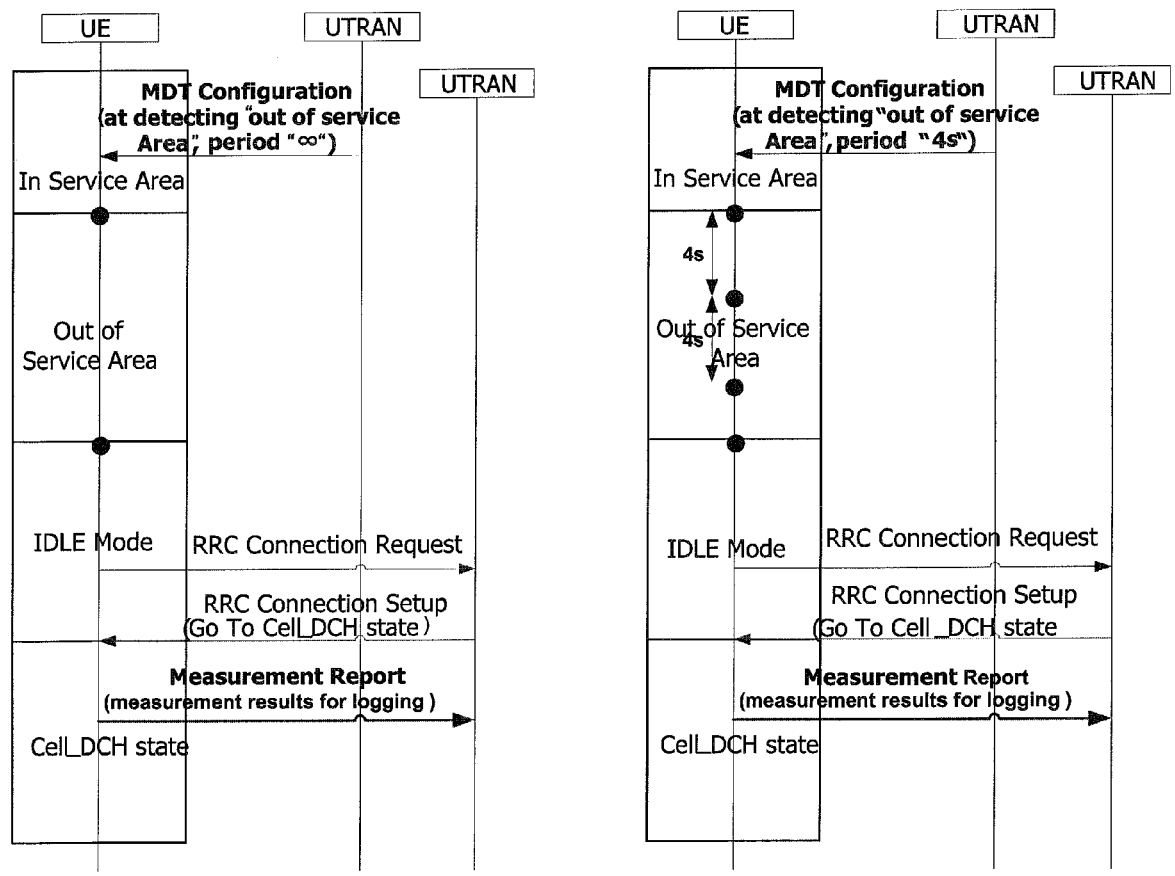
FIG. 5 is a second exemplary view illustrating a method for transmitting a measurement report to a network in accordance with the present invention.

FIG. 5 is a second exemplary view illustrating a method of transmitting a measurement report from a terminal to a network in accordance with the present invention.

First, a network may inform the terminal, via establishment information for MDT (i.e., MDT configuration), when the terminal should store a measurement value of a radio environment for MDT. Here, when the terminal detects an out-of-service area, the network may inform the terminal to store the measurement value of the radio environment, and also inform the terminal of period related information relating to when the terminal should re-store the measurement value of the radio environment after the terminal detects the out-of-service area. Here, the period related information may be a certain value or an infinite value. Afterwards, when the terminal detects the out-of-service area, the terminal may store the measurement value of the radio environment thereof. The radio environment measurement value may be a measurement value at the detecting of the out-of-service area or a previous measurement value which can be used at the detecting of the out-of-service area. After detection of the out-of-service area, when the terminal has moved into the idle (dormant) mode because it had not found a suitable cell for a preset time period, the terminal may store a radio environment measurement value. After the terminal establishes an RRC connection in the idle mode, if the terminal moves into the CELL_DCH mode or CELL_FACH mode, the terminal may send the radio environment measurement value to a newly selected another network together with a Measurement Report message. Also, the terminal may send the radio environment measurement value via another RRC message or NAS message. Also, when the terminal receives a response indicating a successful reception of the RRC message or NAS message from the network, for example, upon receiving RLC ACK responsive to the Measurement Report message, the terminal may delete the stored measurement value.

The present invention may provide a method of transmitting a measurement result in a wireless communication system, the method comprising: receiving, from a first network, a measurement configuration to be used at detecting an out-of-service area in a dormant state; moving into the dormant state, wherein the dormant state is a state that a dedicated radio resource is not allocated to a radio resource control (RRC) connected mode terminal; detecting the out-of-service area in the dormant state; storing the measurement result if the out-of-service area is detected; and transmitting, to a second network, the stored measurement result, wherein the measurement configuration is received in a CELL_DCH state or CELL_FACH, the dormant state is at least one of a CELL_PCH state, a CELL_FACH state and a URA_PCH state, the stored measurement result is a measured value when the out-of-service area is detected, the stored measurement result is a most recently measured value before the out-of-service area is detected, the first network is same as the second network, the out-of-service area is detected if a terminal does not find a RRC connectable network for a certain time period in the dormant state, and the measurement configuration is a minimization driving test (MDT) configuration.

It can be also said that the present invention may provide a method of transmitting a measurement log in a wireless communication system, the method comprising: finding a radio resource control (RRC) connectable network for a certain time period when a terminal is not allocated with a dedicated radio resource while the terminal is in a RRC connected mode; storing the measurement log if the terminal does not find the RRC connectable network for the certain time period; and transmitting the stored measurement log to a network, wherein the radio resource control (RRC) connectable network is a RRC connectable radio network control (RNC) or a RRC connectable cell, the RRC connected mode is at least one of a CELL_PCH mode, a CELL_FACH mode and a URA_PCH mode, the stored measurement log is a measured value when the terminal does not find the RRC connectable network for the certain time period, the stored measurement log is a most recently measured value before the terminal does not find the RRC connectable network for the certain time period.

Hereinafter, a terminal in accordance with the present invention will be described.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

EFFECT OF THE INVENTION

The present invention provides a method by which a connected mode terminal, not in CELL_DCH mode, can efficiently measure a terminal log for MDT in UMTS system. According to the present invention, a network can establish a cell coverage and a mobility management, and reestablish a cell capacity and a common channel, based upon the measurement log of the terminal. That is, the network can efficiently establish network parameters using information sent by the terminal, without a passive driving test which was performed for establishing appropriate parameters, such as maintenance and repair, mobility management and the like, resulting in effective reduction of maintenance costs of the network.

The invention claimed is:

1. A method of transmitting a measurement result from a terminal to a network in a wireless communication system, the method comprising:
receiving a measurement configuration from the network while the terminal is in a CELL_DCH or a CELL_FACH state;
logging the measurement result, in accordance with the measurement configuration after transitioning from the CELL_DCH state to a CELL_PCH or URA_PCH state and the terminal is considered to be in an out-of-service area, wherein the terminal is considered to be in an out-of-service area if the terminal does not find any suitable cell for a certain time period; and
transmitting the logged measurement result to the network.

2. The method of claim 1, wherein the logged measurement result is a measured value when the out-of-service area is detected.

3. The method of claim 1, wherein the logged measurement result is a most recently measured value before the out-of-service area is detected.

4. The method of claim 1, wherein the measurement configuration is a minimization driving test (MDT) configuration.

5. A method of transmitting a measurement log from a terminal to a network in a wireless communication system, the method comprising:
   receiving a measurement configuration from the network, wherein the terminal is connected to a radio resource control (RRC) network;
   transitioning from a CELL_DCH state to a CELL_PCH or URA_PCH state;
   storing the measurement log, in accordance with the measurement configuration received from the network, after transitioning from the CELL_DCH state to a CELL_PCH or URA_PCH state and the terminal is considered to be in an out-of-service area, wherein the terminal is considered to be in an out-of-service area if the terminal does not find any suitable cell for a certain time period; and
   transmitting the stored measurement log to the network.

6. The method of claim 5, wherein the radio resource control (RRC) network is a RRC connectable radio network control (RNC) or a RRC connectable cell.

\* \* \* \* \*